United States Patent [19]
Looykens et al.

[11] Patent Number: 5,862,006
[45] Date of Patent: Jan. 19, 1999

[54] APPARATUS FOR RECORDING A DIGITAL INFORMATION SIGNAL IN A TRACK ON A RECORD CARRIER AND ENCODING MEANS FOR ENCODING SAID DIGITAL INFORMATION SIGNAL

[75] Inventors: Marinus A.H. Looykens; Albert M.A. Rijckaert, both of Eindhoven, Netherlands

[73] Assignee: U.S. Philips Corporation, New York, N.Y.

[21] Appl. No.: 608,263

[22] Filed: Feb. 28, 1996

[30] Foreign Application Priority Data

Jun. 22, 1995 [EP] European Pat. Off. .............. 85201689

[51] Int. Cl.$^6$ ...................................................... G11B 5/09
[52] U.S. Cl. ................................. 360/51; 360/40
[58] Field of Search ................... 360/40, 46, 48, 360/51, 32

[56] References Cited

U.S. PATENT DOCUMENTS 5,128,811  7/1992  Van Gestel ................................. 360/46
5,245,483  9/1993  Van Gestel ................................. 360/40
5,432,651  7/1995  Maeno et al. ............................. 360/40

FOREIGN PATENT DOCUMENTS

0317013A1  5/1989  European Pat. Off. .......... G11B 5/09
0492704A1  7/1992  European Pat. Off. ......... H04N 9/80

*Primary Examiner*—Nabil Hindi
*Assistant Examiner*—Regina Y. Neal
*Attorney, Agent, or Firm*—Michael E. Belk

[57] ABSTRACT

When recording a preamble signal and nT precoded data, a switch is provided for obtaining a serial datastream of the preamble signal and the precoded data for recording in a track on a record carrier. Various solutions are described for improving syncword detection upon reproduction of the recorded data. In one such solution, an nT precoder is provided. The nT precoder includes a signal combination unit and a delay unit for realizing a signal delay of nT. Further, a switching unit is provided having a first and a second input, an output and a control signal input. The second input of the switching unit is coupled to an output of the signal combination unit, and the output of the switching unit is coupled to an input of the nT delay unit.

11 Claims, 4 Drawing Sheets

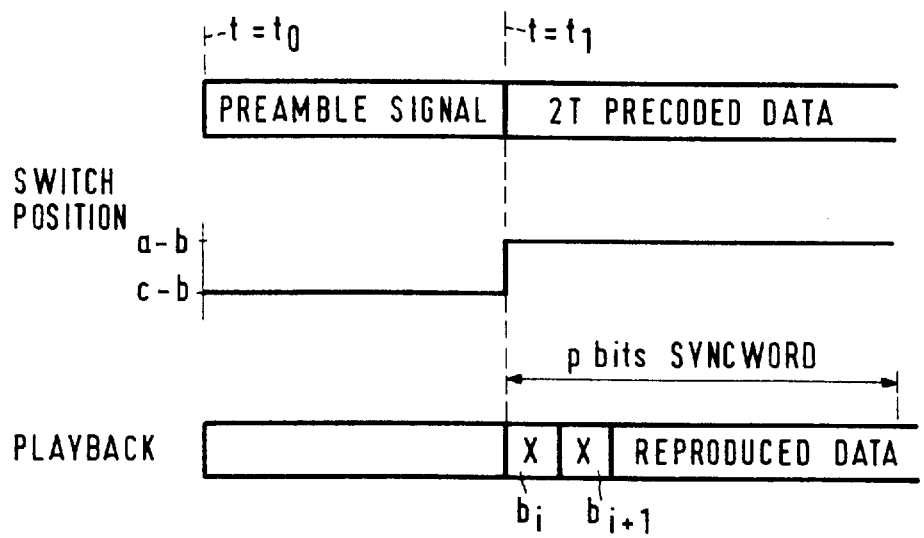
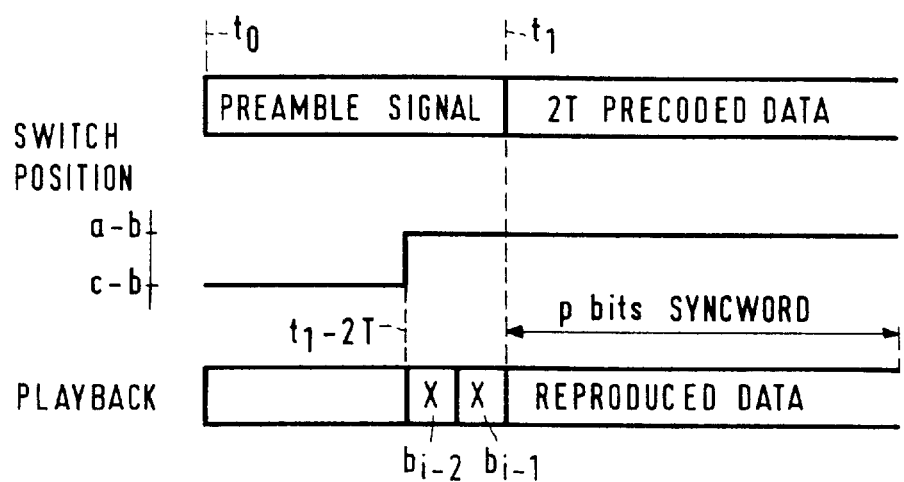

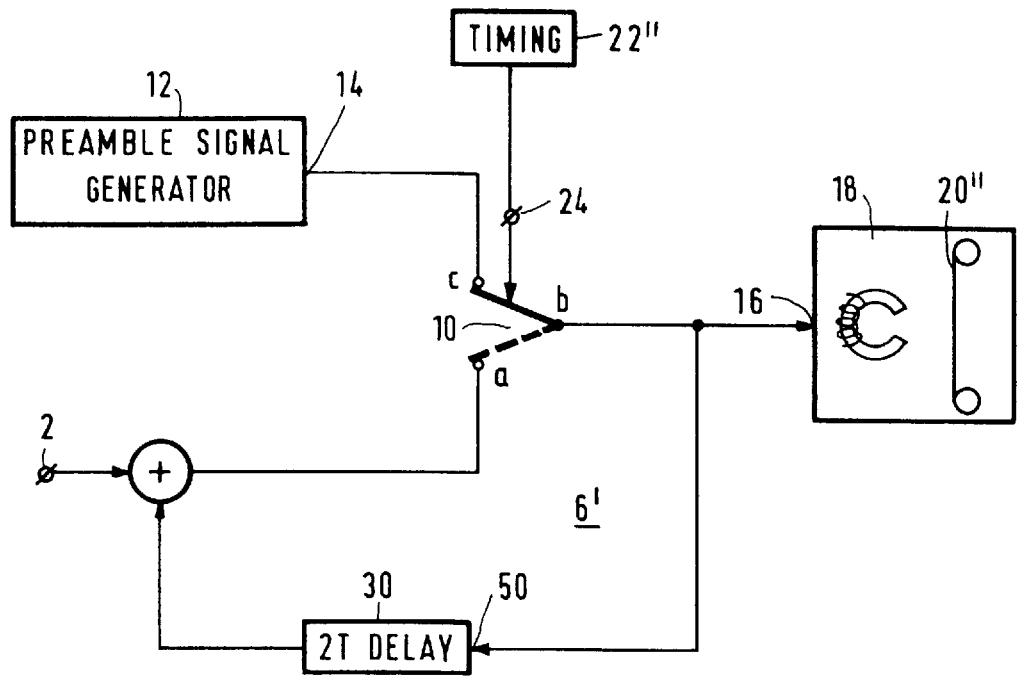
FIG.5
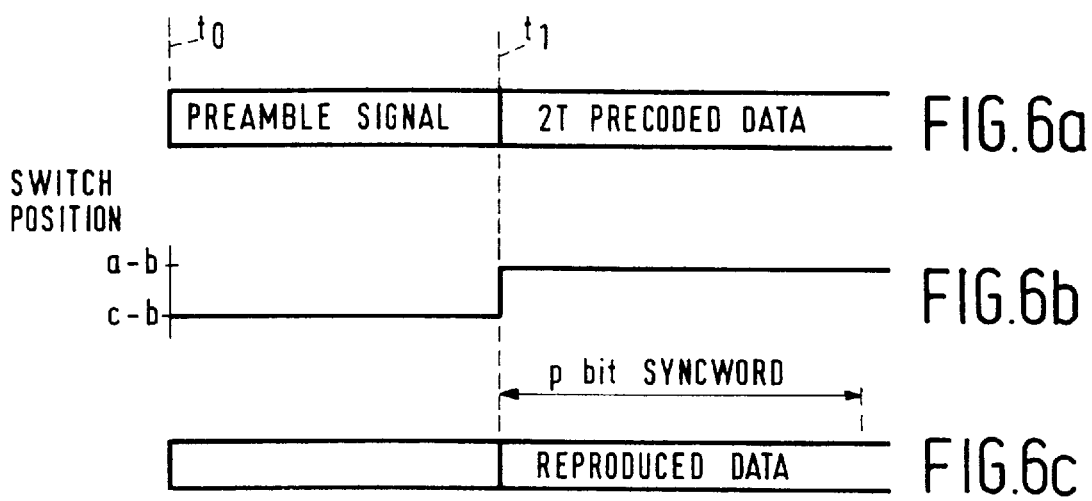
FIG.6a
FIG.6b
FIG.6c

APPARATUS FOR RECORDING A DIGITAL INFORMATION SIGNAL IN A TRACK ON A RECORD CARRIER AND ENCODING MEANS FOR ENCODING SAID DIGITAL INFORMATION SIGNAL

BACKGROUND OF THE INVENTION

The invention relates to an apparatus for recording a digital information signal in a track on a record carrier, the apparatus including:

input apparatus for receiving the digital information signal;

encoding apparatus for encoding the digital information signal so as to obtain a channel signal, the encoding apparatus including a nT precoder, where n is an integer for which holds n≧1, and T is the bit time in the digital information signal, the nT precoder including signal combination apparatus and delay apparatus for realizing a signal delay of nT;

preamble signal generating apparatus for generating a preamble signal;

switching apparatus for combining the preamble signal and the channel signal, the switching apparatus having a first and second input, an output and a control signal input, the first input of the switching apparatus being coupled to an output of the preamble signal generating apparatus;

timing apparatus for timing the switching apparatus such that the switching apparatus supplies a channel encoded block of information of the digital information signal which is preceded by the preamble signal;

writing apparatus for writing the preamble signal and the channel encoded block of information of the digital information signal in the track on the record carrier, and to encoding apparatus for encoding said digital information signal.

An apparatus as defined in the opening paragraph is known from EP-A 492,704, to which U.S. Pat. No. 5,245,493 corresponds, see especially the FIG. 12. n equals 2 in the prior art apparatus.

The prior art apparatus records a digital information signal, that may be a digital video signal or a digital audio signal or may include both the digital video signal and the digital audio signal or may even include a digital data signal, in slant tracks on a record carrier. The tracks are formed by a preamble track portion in which a preamble signal is recorded, followed by a data track portion in which the channel signal is recorded. The channel signal recorded in a data track portion is the 2T precoded version of a sequence of datablocks (syncblocks) each datablock (syncblock) including a sync word which is followed by a number of bytes of information. The preamble signal is used during reproduction to lock the internal oscillator of the reproducing apparatus to the bitclock included in the preamble signal. Next, the syncwords in the datablocks (syncblocks) are detected so as to enable the retrieval of the data information included in the data blocks.

Those skilled in the art are also directed to EP-A 317,013 to which U.S. Pat. No. 5,128,811 corresponds.

The above citations are hereby incorporated in whole by reference.

SUMMARY OF THE INVENTION

The invention aims at improving syncword detection during a subsequent reproduction of the information recorded in the tracks. The apparatus in accordance with the invention is characterized in that the switching apparatus form part of the nT precoder, the second input of the switching apparatus being coupled to an output of the signal combination apparatus, the output of the switching apparatus being coupled to an input of the nT delay apparatus.

The invention is based on the following recognition. The prior art apparatus generates a preamble signal that is defined as a write current pattern. The digital information signal is precoded using the 2T precoder to generate the write current, in order to write the digital information signal on the record carrier. The transition of the preamble signal to the 2T precoded digital information signal during recording results during reproduction in two unknown bits at the start of the reproduced digital information signal. This for the reason that the contents of the 2T delay apparatus in the precoder at the start of precoding the digital information signal is generally not equal to the last two bits of the preamble signal (the write current signal). As a result, two bits less are available during reproduction for syncword detection, as the syncword is the first word in the precoded datastream that directly follows the preamble signal.

In accordance with the invention, the input of the delay apparatus is coupled to the output of the switching apparatus, and thus receives the preamble pattern prior to the switching apparatus switching over to the other position. The contents of the nT delay apparatus is now equal to the last n bits of the preable signal, and thus are the first n bits of the precoded information defined. This enables the syncword detecting to be more reliable, as an increased number (n) of bits are available for syncword detection. Otherwise said: the syncword detector can detect syncwords that are n bits longer.

Another solution can be applied to the prior art apparatus by advancing the moment of switching over to the other switch position by nT at minimum.

BRIEF DESCRIPTION OF THE INVENTION

These and other aspects of the invention will be apparent from and further elucidated with reference to embodiments described in the following figure description, in which:

FIGS. 3a–3c show the timing of some signals;

FIGS. 4a–4c show one solution in accordance with the invention, applied to the apparatus of FIG. 1;

FIG. 5 shows an embodiment of an apparatus in accordance with the invention, using another solution;

FIGS. 6a–6c show again the timing of some signals in the apparatus of FIG. 5;

DETAILED DESCRIPTION OF THE PREFERRED EMBODIMENTS

Figure 1:
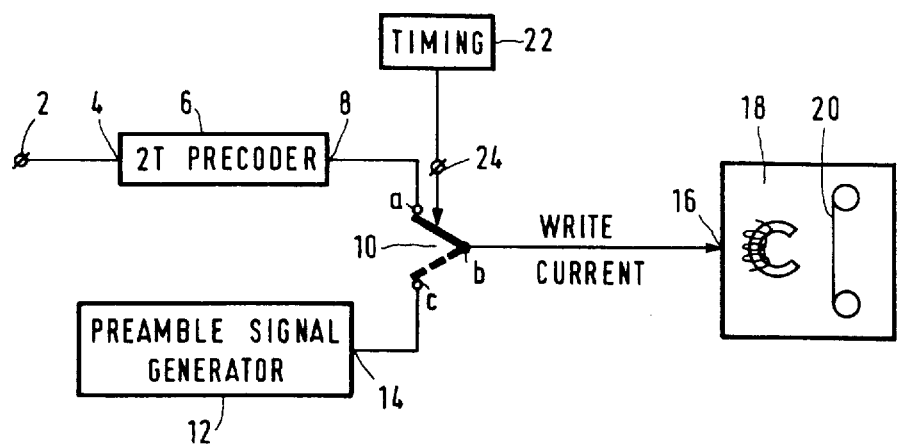
FIG. 1 shows an embodiment of the apparatus of the invention.
Figure 2:
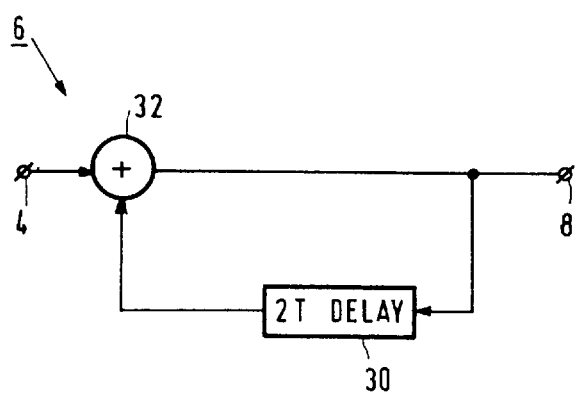
FIG. 2 shows an embodiment of a 2T precoder.

FIG. 1 shows schematically relevant parts of a specific embodiment of the apparatus of the invention. Parts of the apparatus are similar to the recording part of a Partial Response Class IV (PRIV) system. For a further discussion of a PRIV system, reference is made to EP-A 317,013. An input terminal 2 is coupled to an input 4 of a 2T precoder 6, an output 8 of which is coupled to a terminal 'a' of a controllable switch 10. A preamble signal generator 12 is present having an output coupled to a terminal 'c' of the switch 10. A terminal b is coupled to an input 16 of a write unit 18. A timing unit 22 is present for generating timing signals for various elements in the apparatus. Timing unit 22 provides the novel timing described below with reference to FIG. 4. FIG. 1 shows only the generation of a timing signal that is supplied to a control signal input 24 of the switch 10. The write unit 18 is provided with at least one write head for writing the signal applied to its input 16 on a record carrier 20. The novel signal recorded on record carrier 20 is described below. A 2T precoder is well known in the art. FIG. 2 shows an embodiment of a 2T precoder, which includes a signal combination unit 32 and a delay unit 30.

The generator 12 generates a preamble signal in the form of a write current pattern that may include a sequence of codewords, as defined in EP-A 492,704. A codeword could be the following binary sequence

00011100011100000111100011, or the inverse binary sequence. The preamble signal is defined as a write current pattern, so that the above sequence is supplied to the write unit 18 directly. That is: without any precoding in a 2T precoder.

The digital information signal is supplied to the input terminal 2 and precoded in the precoder 6 so as to obtain the write current (the channel signal) for recording the digital information signal on the record carrier 20. EP-A 492,704 describes a digital information signal in the form of a sequence of datablocks (syncblocks) each datablock (syncblock) including a sync word which is followed by a number of bytes of the digital information. When recording the digital information on the record carrier, first the preamble signal is recorded, followed by the sequence of precoded datablocks.

FIG. 3a shows schematically as a function of time, the signal supplied to the input 16 of the write unit 18 in previous apparatus. Under the influence of a timing signal (not shown) generated by a timing unit of the previous apparatus, the generator 12 starts at a time instant $t=t_0$ to generate the preamble signal. At this time instant, the switch 10 is in (or: is switched to) the position c-b, so that the preamble signal is supplied to the write unit 18 as a write current and recorded in a track. The generation of the preamble signal is terminated at the time instant $t=t_1$. Next, a source (not shown) starts supplying the digital information signal at time instant $t=t_1$, eg. also under the influence of a timing control signal (not shown) supplied by the previous timing unit. The information signal is 2T precoded and supplied to the a-terminal of the switch 10. Further, under the influence of the a timing control signal supplied by the previous timing unit to the switch 10, the switch changes its switch position into the position a-b, so that the 2T precoded data is supplied to the write unit 18 at the time instant $t=t_1$. This is shown in FIG. 3a, which shows the serial datastream (write current) supplied to the write unit 18. FIG. 3b shows the timing control signal supplied by the previous timing unit to the switch 10. Prior to the instant $t_1$, the switch is in its position c-b, and after the time instant $t_1$, the switch 10 is in its position a-b. As a consequence, the contents of the 2T delay 30 in the precoder 6 at the time instant $t_1$ is not equal to the last two bits of the preamble signal. This results in problems during reproduction.

FIG. 3c shows schematically the signal received upon reproduction in the previous apparatus. As can be seen, the first two bits $b_i$, $b_{i+1}$ in the reproduced data are unknown. If the first p bits are defined as a sync word, only p-2 bits can be used in a syncword detector to detect the sync word. Such detection is less reliable than if the sync word detector could have made use of all the p bits for sync word detection.

FIGS. 4a–4c shows a first solution to this problem that can be applied in the apparatus of FIG. 1. FIG. 4a shows the preamble signal generated by the generator 12 in the time interval $t_0$, $t_1$, and the 2T precoded data supplied by the precoder 6 starting at the time instant $t_1$. FIG. 4b shows the timing signal supplied by the timing unit 22 (in FIG. 1) to the switch 10. As can be seen, the switch 10 switches over to its position a-b two bit periods T before the time instant $t_1$. That means that the last two bits of the preamble signal are not recorded on the record carrier 20. This is not a problem, as the preamble signal is long enough to realize the locking in of the internal oscillator of the reproducing apparatus to the bitclock included in the preamble signal.

By switching the switch to the position 2 bit periods before $t_1$, this means that at the time instant $t_1$, the contents of the 2T delay unit 30 in the precoder 6 is equal to the last two bits of the preamble signal. Starting from the time instant $t_1$, precoded data is supplied by the precoder 6 to the write unit 18.

Upon reproduction, the datastream shown schematically in FIG. 4c is obtained. As can be seen, the bits $b_{i-2}$, $b_{i-1}$ are unknown. The reproduced data is however valid, starting from the time interval $t_1$. As a result, the full p-bit long syncword can be used in the sync detector for syncdetection, during reproduction.

FIG. 5 shows another solution of the problem. The apparatus shown in FIG. 5 shows large resemblances to the apparatus of FIG. 1. Elements in FIG. 1, 2 and 5 having the same reference numerals are essentially the same. As can be seen in FIG. 5, the switch 10 is now incorporated into the 2T precoder 6', in that the b-terminal of the switch 10 is further coupled to the input 50 of the 2T delay unit 30.

FIG. 6a shows again the preamble signal generated by the generator 12 in the time interval $t_0$,$t_1$, and the 2T precoded data supplied by the precoder 6'. FIG. 6b shows the timing signal supplied by the timing unit 22" (in FIG. 5) to the switch 10. As can be seen, the switch 10 switches over to its position a-b at the time instant $t_1$. As the input of the 2T delay unit 30 is coupled to the b-terminal of the switch 10, this means that the delay unit 30 is constantly supplied with the preamble signal, so that at the time instant $t_1$ of switching over, the contents of the delay unit 30 is equal to the last two bits of the preamble signal. As a result, precoded data is supplied by the precoder 6', whilst, moreover, the preamble signal is recorded correctly.

Upon reproduction, the datastream shown schematically in FIG. 6c is obtained. As can be seen, all reproduced bits are valid. As a result, the full p-bit long syncword can be used in the sync detector for syncdetection, during reproduction.

Figure 7:
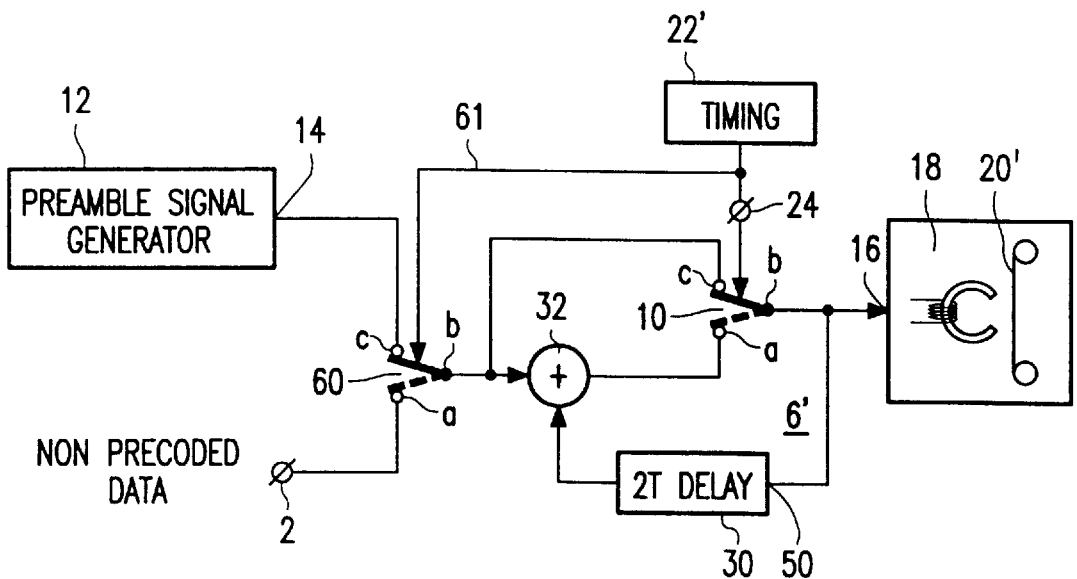
FIG. 7 shows another embodiment of the apparatus.
Figure 8A:
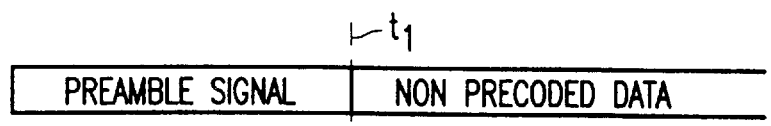
FIGS. 8a–8c show the timing of some signals in the apparatus of FIG. 7.
Figure 8B:
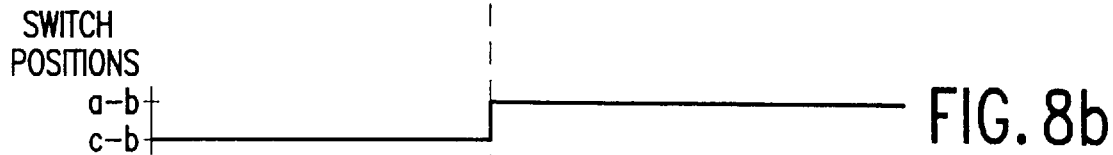
Figure 8C:
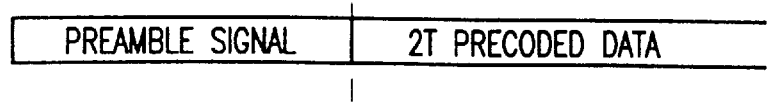

FIG. 7 shows another embodiment, which shows close resemblances with the embodiment of FIG. 5. A switch 60 is present which multiplexes the preamble signal and the non-precoded data applied to the input 2, under the influence of a timing signal 61 applied to the timing unit 22'. This results in the serial datastream shown in FIG. 8a. At the time instant $t_1$ the switch 60 switches over between the positions c-b and a-b. Now the combination unit 32 in the 2T precoder, as well as the terminal c of the switch 10 receive the serial datastream of FIG. 8a. At the time instant $t_1$ the switch 10 switches over from the switch position c-b to the switch position a-b, as can be seen in FIG. 8b, under the influence of the control signal applied to the input 24. As a result, the signal shown in FIG. 8c is supplied to the input 16 of the write unit 18.

Various modifications of the invention as explained above are possible. It can more generally be said that an nT precoder could have been used, where n is an integer, for which holds that n≧1. For the solution described in FIGS. 4a–4c, this means that switching over the switch position a-b should take place at the time instant $t_1-nT$.

Further, for both solutions shown in FIGS. 4a–4c and in the FIGS. 5 and 6, there is no objection in switching over to the switch position a-b earlier than the time instant $t_1-nT$, provided that the valid portion of the preamble signal after reproduction from the record carrier is long enough to enable a locking in of the internal oscillator of the reproducing apparatus to the bitclock included in the preamble signal.

It should further be noted that the preamble signal and the precoded data as shown in (a) of FIG. 2 can be recorded as the beginning portion of a track. It is however also possible that a track includes various track portions serially located in said track. Each track portion may include a preamble signal, followed by precoded data. The solutions disclosed above will be applied to the generation of the information so as to generate the track portions in the track.

Further, it should be noted that the combination of the precoder and the switch could have been incorporated into one electronic component, such as an integrated circuit, or could have been realized in software form in a microprocessor.

The recording apparatus in accordance with the invention may be one of the helical scan recording type, or the linear recording type. The invention is equally well applicable in recording apparatuses for recording on disk-like record carriers. Further, the record carrier may be of the magnetic or optical type.

Therefore, it should be observed that the invention is not restricted to the embodiments described, but is limited and defined only by the appended claims.

I claim:

1. Apparatus for recording a digital information signal in a track on a record carrier, the apparatus comprising:
    input means for receiving the digital information signal;
    encoding means for encoding the digital information signal so as to obtain a channel signal, the encoding means including a nT precoder, where n is an integer for which holds n≧1, and T is the bittime in the digital information signal, the nT precoder including signal combination means and delay means for realizing a signal delay of nT;
    preamble signal generating means for generating a preamble signal;
    switching means for combining the preamble signal and the channel signal, the switching means having a first and second input, an output and a control signal input, the first input of the switching means being coupled to an output of the preamble signal generating means;
    timing means for timing the switching means such that the switching means supplies a channel encoded block of information of the digital information signal which is preceded by the preamble signal; and
    writing means for writing the preamble signal and the channel encoded block of information of the digital information signal in the track on the record carrier;
    and wherein:
    the switching means form part of the nT precoder;
    the second input of the switching means is coupled to an output of the signal combination means; and
    the output of the switching means is coupled to an input of the nT delay means.

2. The apparatus of claim 1, wherein, the timing means include means to supply a control signal to the control signal input of the switching means such that the switching means realize an internal connection between its first input and its output during a time interval coinciding in time with at least a part of a time interval in which the preamble signal generating means generates the preamble signal, and such that the switching means realize an internal connection between its second input and its output during a time interval in which the block of information of the digital signal is supplied to the input of the nT precoder for channel encoding.

3. The apparatus of claim 2, wherein the timing means include means to supply a control signal to the control signal input of the switching means such that the switching means switches over from the internal connection between its first input and its output to the internal connection between its second input and its output at a time instant mT prior to the time instant of the start of the supply of the block of information of the digital information signal, where m is an integer for which holds m≧0.

4. The apparatus as claimed in claim 3, wherein m=0.

5. The apparatus of claim 1, wherein n=2.

6. The apparatus of claim 1, wherein:
    the timing means include means to supply a control signal to the control signal input of the switching means such that the switching means realize an internal connection between its first input and its output during a time interval coinciding in time with at least a part of a time interval in which the preamble signal generating means generates the preamble signal, and such that the switching means realize an internal connection between its second input and its output during a time interval in which the block of information of the digital signal is supplied to the input of the nT precoder for channel encoding;
    the timing means include means to supply a control signal to the control signal input of the switching means such that the switching means switches over from the internal connection between its first input and its output to the internal connection between its second input and its output at a time instant mT prior to the time instant of the start of the supply of the block of information of the digital information signal, where m is an integer for which holds m≧0;
    m=0; and
    n=2.

7. Apparatus for recording a digital information signal in a track on a record carrier, the apparatus comprising
    input means for receiving the digital information signal;
    encoding means for encoding the digital information signal so as to obtain a channel signal, the encoding means including an nT precoder, where n is an integer for which holds n≧1, and T is the bittime in the digital information signal, the nT precoder including signal combination means and delay means for realizing a signal delay of nT;
    preamble signal generating means for generating a preamble signal;
    switching means for combining the preamble signal and the channel signal, the switching means having a first and second input, an output and a control signal input, the first input of the switching means being coupled to an output of the preamble signal generating means;
    timing means for controlling the switching means such that the switching means supplies a channel encoded block of information of the digital information signal which is preceded by the preamble signal; and writing means for writing the preamble signal and the channel encoded block of information of the digital information signal in the track on the record carrier; and wherein the timing means controls the switching means such that:

the switching means connects to allow writing the preamble signal at least during a part of a time interval in which the preamble signal generating means generates the preamble signal; and the switching means switches over from the connection to allow writing the preamble signal to a connection to allow writing the channel encoded block at a time instant mT prior to the time instant of the start of the supply of the block of information of the digital information signal, where m is an integer for which holds m≧1.

8. The apparatus of claim 7, wherein m=n.

9. The apparatus of claim 7, wherein:

m=n; and n=2.

10. Encoding means for encoding a digital information signal so as to obtain a channel signal, the encoding means comprising a nT precoder, where n is an integer for which holds n≧1, and T is the bittime in the digital information signal, the nT precoder comprising signal combination means and delay means for realizing a signal delay of nT, the encoding means further comprising switching means having a first and second input, an output and a control signal input, the second input of the switching means being coupled to an output of the signal combination means, the output of the switching means being coupled to an input of the nT delay means.

11. The encoding means as claimed in claim 10, wherein n=2.

* * * * *